Patented Sept. 20, 1949

2,482,237

UNITED STATES PATENT OFFICE 2,482,237

IMPREGNATING PAPER MAKING FELTS WITH POLYVINYL ALCOHOL CONTAINING EMULSION

Orion William Berglund, Dayton, Ohio, assignor to The Orr Felt & Blanket Company, Piqua, Ohio, a corporation of Ohio No Drawing. Application October 24, 1946, Serial No. 705,500

6 Claims. (Cl. 117—140)

This invention deals with a method of treating felts for paper making or like machines and with the articles obtained thereby.

It is an object of this invention to provide felts for paper making or like machines that have a high abrasion resistance.

It is still another object of this invention to provide felts for paper making or like machines that have a high absorptive capacity for water.

These and other objects are accomplished by impregnating the felts with a mixture of polyvinyl alcohol and an aqueous emulsion or solution of synthetic rubber or synthetic resin and curing said mixture on the felts.

As resins, all water soluble and water emulsifiable resins were found suitable; in particular, urea formaldehyde resin and phenol formaldehyde resin in aqueous solution and polyvinyl butyral suspended in water were found satisfactory. Among the rubbers, acrylonitrile butadiene copolymer was found preferable; however, other synthetic latices are also operative with satisfaction.

The felts usually contain more or less acid which originates from pretreating processes; neutralization of this acid is necessary in order to obtain uniform impregnation of rubbers to the felts. If the acid is not neutralized, the impregnating solution will change from its alkali state to an acid state and the rubber or latex will precipitate or kick-out and be of no value as an impregnant. For this reason the impregnating emulsions are preferably given a pH above 7; this may be done by any alkaline solution. I have used ammonia solution with advantage for this purpose. The amount of alkali is dependent upon the pH of rubber emulsion and upon the acid content of the felt.

The addition of curing catalysts, such as diammonium phosphate, tartaric acid or the like was also found to be advantageous.

In the following table a number of experiments are compiled in order to illustrate, but not to limit, the object of my invention.

| Example | I | II | III | IV | V | VI |
|---|---|---|---|---|---|---|
| Aqueous resin (conc. 60%) | 80 g. urea formaldehyde resin. | 80 g. urea formaldehyde resin. | 50 g. urea formaldehyde resin. | 33 g. urea formaldehyde resin. | 80 g. acrylonitrile butadiene copolymer. | 80 g. polyvinyl butyral. |
| Polyvinyl alcohol 15% | 20 g. | 20 g. | 50 g. | 67 g. | 20 g. | 20 g. |
| Conc. of resin (rubber) Polyvinyl alcohol mixture. | 12.75% | 12.75% | 15% | 15% | 15% | 12% |
| pH | 10. | 4. | 4. | 4. | 10. | 10. |
| $NH_4OH$ | 8% | | | | 4% | 2.5%. |
| $(NH_4)_2HPO_4$ | 1% | 1% | 1% | 1% | 1% | |
| Tartaric acid | | 1% | 1% | 1% | | |
| Pick-up | 12% | 11% | 11% | 12% | 15% | 12%. |
| Curing temperature | 225° F. | 225° F. | 225° F. | 225° F. | 225° F. | 225° F. |
| Curing time | 3 hrs. | 3 hrs. | 3 hrs. | 3 hrs. | 3 hrs. | 3 hrs. |
| Increase of abrasion resistance | 67% | 83% | 133% | 167% | 83% | 133%. |
| Water pick-up | 223% | 231% | 248% | 337% | 212% | 232%. |
| Water retention after $H_2O$ removed by mechanical means. | 100% | 100% | 107% | 115% | 97% | 91%. |
| Water differential | 123% | 131% | 141% | 222% | 115% | 141%. |

The process used for impregnating the felts was the same in all instances. The felt was immersed into the aqueous mixture, the excess removed by mechanical means such as by squeezing or centrifuging, and the impregnated felt cured thereafter, preferably at a temperature of from 200 to 225° F. for substantially 3 hours.

The impregnation may, of course, be carried out by any other means known in the art; thus application by spraying was equally satisfactory.

It will be seen from the test results listed in the table that the abrasion resistance was increased by as much as from 67% to 133% and that the water differential ranged from 115% to as high as 222%. Due to this factor, the service life was considerably enhanced by the treatment according to this invention. The water differential is a good indicator for the efficiency of the felts in removing the water from paper pulp.

It will be understood that while there have been described herein certain specific embodiments of the invention, it is not intended thereby to have it limited to or circumscribed by the details given, since the invention is susceptible to various modifications and changes which come within the spirit of the disclosure and the scope of the appended claims.

I claim:
1. In a method of making felts for paper making or like machines, the steps of (a) impregnating the felts with a mixture consisting of from 20 to 67 parts by weight of a 15% polyvinyl alcohol solution and from 80 to 33% of a 60% aqueous mixture of acrylonitrile butadiene copolymer; (b) removing any excess of said impregnating material from the felt by mechanical means so as to leave a pick-up of from 10 to 25% of cured material; and (c) curing said impregnated felt at a temperature of from 200 to 225° F. for approximately 3 hours.

2. As a new article of manufacture, a felt for paper making or like machines, said felt being impregnated with 10 to 25% of its weight of a polymerized mixture consisting of from 20–67 parts of polyvinyl alcohol and from 80–33 parts of acrylonitrile butadiene copolymer.

3. As a new article of manufacture, a felt for paper making or like machines, said felt being impregnated with 11 to 15% of its weight of a polymerized mixture consisting of from 20 to 67 parts of polyvinyl alcohol and from 80–33 parts of acrylonitrile butadiene copolymer.

4. As a new article of manufacture, a felt for paper making machines, said felt being impregnated with from 10 to 25% of its weight of a polymerized mixture consisting of 4 parts of acrylonitrile butadiene copolymer and 1 part of polyvinyl alcohol.

5. As a new article of manufacture, a felt for paper making or like machines, said felt being impregnated with 10 to 25% of its weight of a polymerized mixture consisting of a major portion by weight of acrylonitrile butadiene copolymer and a minor portion by weight of polyvinyl alcohol.

6. In a method of making felts for paper making or like machines, the steps of (a) impregnating the felts with a mixture consisting of a minor portion by weight of polyvinyl alcohol solution and a major portion by weight of acrylonitrile butadiene copolymer; (b) removing any excess of said impregnating material from the felt by mechanical means so as to leave a pick-up of from 10 to 25% of cured material; and (c) curing said impregnated felt at a temperature of from 200 to 225° F. for approximately 3 hours.

ORION WILLIAM BERGLUND.

REFERENCES CITED

The following references are of record in the file of this patent:

UNITED STATES PATENTS

| Number | Name | Date |
|---|---|---|
| 1,482,012 | Howard | Jan. 29, 1924 |
| 2,256,853 | Schwartz | Sept. 23, 1941 |
| 2,277,259 | Schnabel et al. | Mar. 24, 1942 |
| 2,322,888 | Schwartz | June 29, 1943 |
| 2,328,057 | Coulter | Aug. 31, 1943 |

OTHER REFERENCES

Ser. No. 323,052, Holl (A. P. C.), published May 4, 1943.